United States Patent [19]
Ichiyoshi

[11] Patent Number: 4,879,713
[45] Date of Patent: Nov. 7, 1989

[54] SATELLITE-BASED VEHICLE COMMUNICATION/POSITION DETERMINATION SYSTEM

[75] Inventor: Osamu Ichiyoshi, Tokyo, Japan

[73] Assignee: NEC Corporation, Japan

[21] Appl. No.: 249,943

[22] Filed: Sep. 27, 1988

[30] Foreign Application Priority Data

Sep. 30, 1987 [JP] Japan ................................ 62-246285

[51] Int. Cl.$^4$ ............................ H04J 1/02; H04B 7/85
[52] U.S. Cl. ........................................ 370/75; 455/25; 342/357
[58] Field of Search .................... 370/69.1, 75, 13.1; 375/3, 3.1, 1; 455/11, 12, 24, 25; 342/357, 463, 456, 36

[56] References Cited
U.S. PATENT DOCUMENTS

| | | | |
|---|---|---|---|
| 4,398,286 | 8/1983 | Geesen et al. | 370/69.1 |
| 4,613,864 | 9/1986 | Hofgen | 342/357 |
| 4,700,374 | 10/1987 | Bini | 455/12 |
| 4,740,792 | 4/1988 | Sagey et al. | 342/357 |
| 4,751,512 | 6/1988 | Longaker | 342/357 |

Primary Examiner—Douglas W. Olms
Assistant Examiner—Min Jung
Attorney, Agent, or Firm—Ostrolenk, Faber, Gerb & Soffen

[57] ABSTRACT

A satellite-based vehicle communication/position determination system constituted by N (N≧3) geostationary satellites, a plurality of vehicle stations for performing radio-wave exchange with the satellites using a low-directivity antenna, and a base station having high-directivity antennas for independently performing radio-wave exchange with the N geostationary satellites is disclosed. The base station has a communication FDM receiver, N chirp signal receivers for receiving and pulse compressing chirp signals from a vehicle station, which are obtained via the N geostationary satellites, and a circuit for determining the position of the vehicle station based on time differences of compressed pulses from the chirp signal receivers. Each vehicle station has a communication FDM receiver, a transmitter, a chirp signal generator, and a switching control circuit for controlling to selectively output a transmitting signal or the chirp signal.

1 Claim, 5 Drawing Sheets

(PRIOR ART)

SATELLITE-BASED VEHICLE COMMUNICATION/POSITION DETERMINATION SYSTEM

BACKGROUND OF THE INVENTION

The present invention relates to a satellite-based vehicle communication/position determination system which performs two-way communication between a base station and a vehicle station using three or more geostationary satellites, and in which the base station performs position determination of the vehicle station.

Along with developments in satellite communication techniques, the advent of a satellite-based vehicle communication system is expected much. When a satellite-based vehicle communication system is constituted, one important issue is how to realize a communication/position determination function capable of determining the position of a vehicle station as well as a communication with the vehicle station by utilizing a wide areal property of the satellite communication. It is known that the position of a vehicle station can be accurately determined if at least three geostationary satellites are used.

Figure 1:
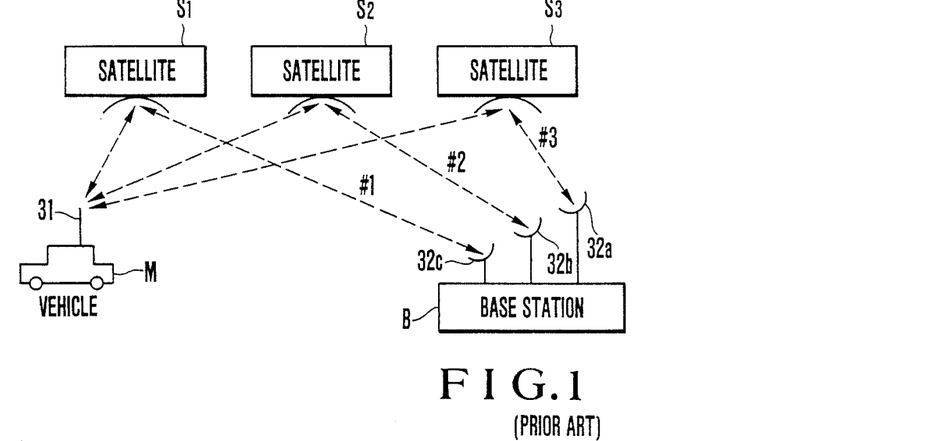
FIG. 1 is a diagram showing a schematic arrangement of a satellite-based vehicle communication/position detection system, which is applied to both the descriptions of the prior art and the present invention.
Figure 2:
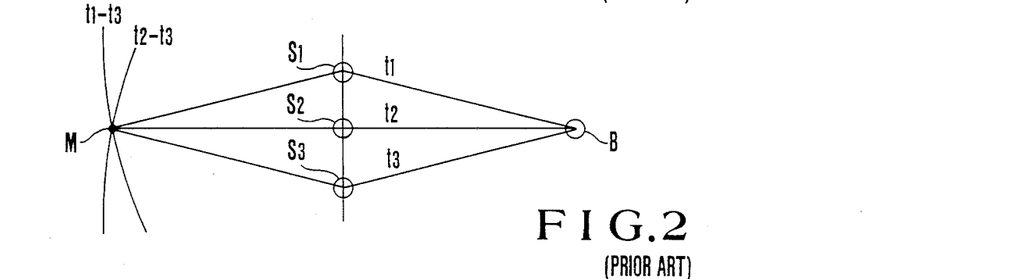
FIG. 2 is a view showing the principle of a vehicle position determination operation.

More specifically, as shown in FIG. 1, a satellite-based vehicle communication/position determination system capable of achieving both communication and position determination functions is constituted by three geostationary satellites $S_1$, $S_2$, and $S_3$, a vehicle station M having a low-directivity antenna 31 for performing radio-wave exchange with the geostationary satellites $S_1$, $S_2$, and $S_3$, and a base station B having high-directivity antennas 32a, 32b, and 32c for independently performing radio-wave exchange with the three geostationary satellites $S_1$, $S_2$, and $S_3$. A signal generated by the vehicle station M is transmitted to the base station B through three different transmission paths #1, #2, and #3. Note that communication need only utilize one of the three geostationary satellites, as a matter of course. As shown in FIG. 2, the base station B performing position determination detects transmission times $t_1$, $t_2$, and $t_3$ in the three different transmission paths #1, #2, and #3, and calculates time differences $t_1-t_3$ and $t_2-t_3$ among the transmission paths. Thus, the position of the vehicle station M is determined in accordance with the intersections of curves based on these time differences.

Figure 3:
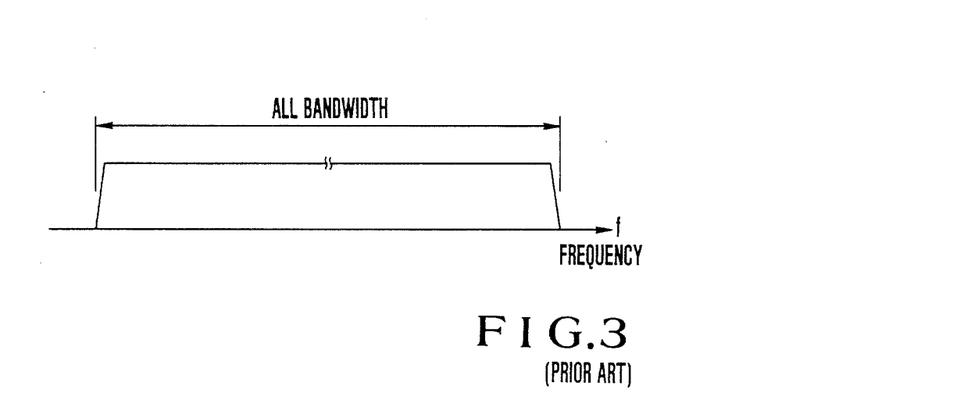
FIG. 3 is a view showing a spectrum of a transmitting signal in a conventional system.
Figure 4:
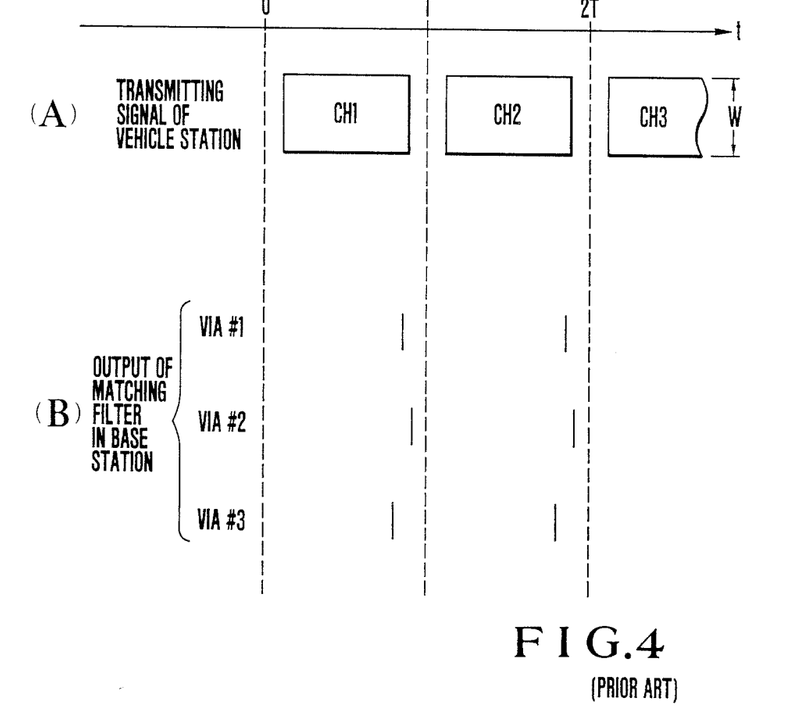
FIGS. 4(A) and 4(B) are views showing the operation of the conventional system.

A satellite-based vehicle communication/position determination system as described in an article entitled "Analysis of the GEOSTART Position Determination System" (L. O. Snively, W. P. Osborne: AIAA, 1986, pp. 50-58) is conventionally known. Although a detailed description is omitted, the conventional system utilizes a spread spectrum modulated signal which is expanded in all the bandwidth of a satellite network, as shown in FIG. 3. In this system, as shown in FIG. 4(A), a vehicle station called from the base station transmits a spread spectrum modulated signal which is diffusion-modulated by a high-speed pseudo random signal within a time interval of a predetermined frame period (T) designated by the base station. The base station receives vehicle signals via the three different transmission paths #1, #2, and #3 at separate antennas 32a, 32b, and 32c, and reproduces and outputs spread spectrum codes using a matching filter as shown in FIG. 4(B). The base station detects time differences among the reproduced spread spectrum codes, and determines the position of the vehicle station.

In the conventional system described above, since all the bandwidth of the satellite network is used, satellite power can be fully utilized. Since the high-speed spread spectrum modulated signal is received and processed by the matching filter, position determination can be performed with high precision. Thus, the conventional system can be an excellent position determination system. However, in view of communication, since a burst transmitting signal can only be transmitted, a communication mode is limited to a message communication mode, and a speech communication mode is impossible to realize. Since a spread spectrum system essentially requires high-speed modulation/demodulation operations, both the vehicle and base stations must have large-scale circuits.

Since a non-spread spectrum circuit normally utilizes a Delay Lock Loop, it takes much time to establish synchronization, resulting in a long processing time.

SUMMARY OF THE INVENTION

It is an object of the present invention to provide a satellite-based vehicle communication/position determination system which is free from conventional drawbacks, and can achieve both two-way communication and a quick, high-precision position determination operation without increasing the circuit scale.

A satellite-based vehicle communication/position determination system according to the present invention comprises N (N≧3) geostationary satellites, at least one vehicle station, and a base station, each vehicle station comprising: a low-directivity antenna for performing radio-wave exchange with the N geostationary satellites; vehicle station FDM (frequency division multiplex) receiving means for frequency-selectively receiving a signal in a communication frequency channel assigned to the self station from signals in a plurality of communication frequency channels received at the low directivity antenna; vehicle station receiving control means for transmitting the signal output from the vehicle station FDM receiving means as a receiving signal to a following circuit, and detecting a base station control signal from the signal; chirp signal generating means for generating a chirp signal for performing frequency sweep over all the bandwidth of a satellite network at a predetermined sweep rate for a predetermined period of time in response to a frame sync signal detected and formed by the vehicle station FDM receiving means; and vehicle station transmitting means for transmitting a communication signal including a position determination start signal from the low-directivity antenna to the N geostationary satellites in the communication frequency channel assigned to the self station, interrupting the transmission of the communication signal for a period of time designated by a control signal from the base station and transmitting the chirp signal from the low-directivity antenna during the interruption period, and the base station comprising: N high-directivity antennas for respectively performing radio-wave exchange with the N geostationary satellites; base station FDM transmitting means for transmitting, from at least one of the N high-directivity antennas to the corresponding geostationary satellite, signals in one or a plurality of communication frequency channels in which the communication signal including the base station control signal for designating a time period for which the chirp signal is to be transmitted is inserted; base station FDM receiving means for receiving and demodulating signals in one or a plurality of communication frequency channels received at one of the N high-directivity antennas; base station reception control means for transmitting the signal output from the base station FDM receiving means to a following circuit as a receiving signal, and detecting a start signal from the signal; N chirp signal receiving means including chirp filters for performing pulse compression processing of the chirp signals received at the N high-directivity antennas; and time difference detecting means for detecting time differences among N compressed pulses sent from the N chirp signal receiving means in response to the detection of the start signal, and forming a position determination signal for calculating the position of the vehicle station.

DESCRIPTION OF THE PREFERRED EMBODIMENT

A preferred embodiment of the present invention will be described hereinafter with reference to the accompanying drawings.

Figure 5:
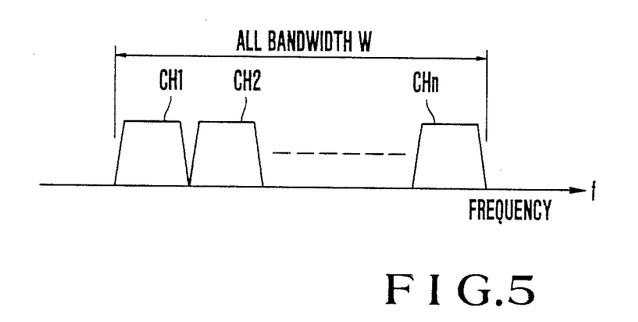
FIG. 5 is a view showing a spectrum of a transmitting signal in the present invention.

As shown in FIG. 5, a satellite-based vehicle communication/position determination system of the present invention realizes the communication/position determination system shown in FIG. 1 on the basis of a satellite-based vehicle communication system of a conventional SCPC (Single Channel Per Carrier)-FDMA type for frequency-dividing all the bandwidth (bandwidth W) of the satellite network into a plurality of communication frequency channels (CH1, CH2, ..., CHn). Position determination is performed by a base station.

Figure 6:
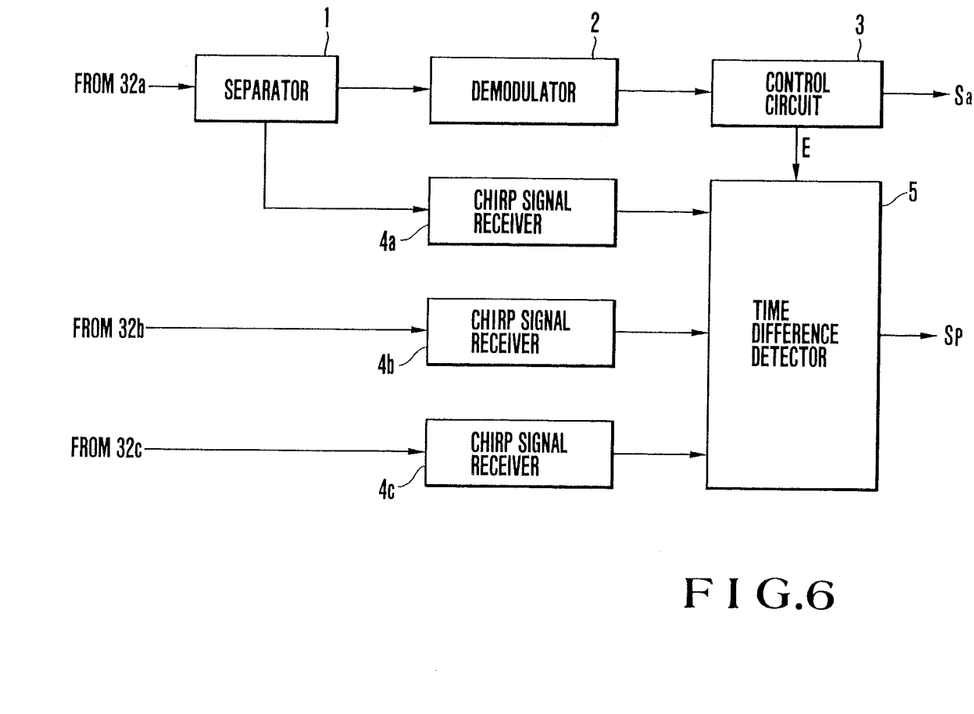
FIG. 6 is a block diagram showing an arrangement of an embodiment of a base station of a system according to the present invention.

FIG. 6 shows an arrangement of a reception/position determination section of the base station. Although not shown, a transmission section of the base station B is the same as that of the conventional arrangement. The transmission section includes a data modulator, an up converter, a high-power amplifier, and the like, and one of three high-directivity antennas 32a, 32b, and 32c is used as a transmitting antenna.

In FIG. 6, signals received at the antennas 32a, 32b, and 32c are respectively input to a separator 1 and chirp signal receivers 4b and 4c. The separator 1 separates the input signal into a communication signal and a chirp signal, and supplies the communication signal to a demodulator 2 and the chirp signal to a chirp signal receiver 4a. The demodulator 2 demodulates the input signal, and outputs the demodulated signal to a control circuit 3. The control circuit 3 outputs the demodulated signal as a reproduced signal $S_a$, and detects a position determination start signal (to be described later). The control circuit 3 outputs the start signal to a time difference detector 5 as a control signal E.

The chirp signal receivers 4a, 4b, and 4c receive chirp signals, and generate compressed pulses using internal chirp filters, respectively. The receivers 4a, 4b, and 4c output the compressed pulses to the time difference detector 5. The time difference detector 5 detects time differences among the compressed pulses at a timing determined by the control signal E from the control circuit 3, and outputs a position determination signal $S_P$ indicating the position of the vehicle station based on the detected time differences.

Figure 7:
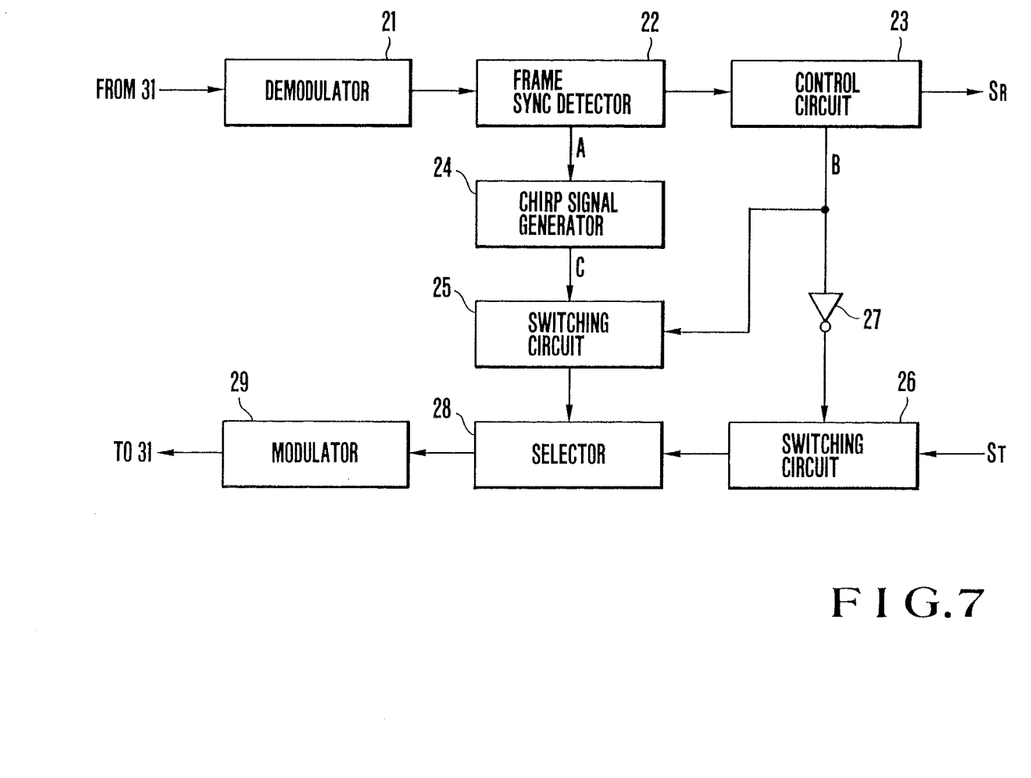
FIG. 7 is a block diagram showing an arrangement of an embodiment of a vehicle of the system according to the present invention.

FIG. 7 shows an arrangement of an embodiment of a vehicle station M.

In FIG. 7, a signal received at an antenna 31 is demodulated by a demodulator 21. The output signal from the demodulator 21 is input to a frame sync detector 22. The frame sync detector 22 outputs the input signal to a control circuit 23, and detects a frame sync signal A from the input signal. The control circuit 23 outputs a receiving signal $S_R$, and detects a base station control signal B. The control circuit 23 outputs the control signal B to a switching circuit 25 and an inverter 27.

A chirp signal generator 24 generates a chirp signal C based on the frame sync signal A supplied from the frame sync detector 22, and outputs it to the switching circuit 25. The switching circuit 25 outputs the chirp signal C received from the chirp signal generator 24 to a selector 28 when the control signal B output from the control circuit 23 is at logic "1".

Meanwhile, a transmitting signal $S_T$ is input to a switching circuit 26. The switching circuit 26 outputs a transmitting signal $S_T$ to the selector 28 when a control signal obtained by inverting the control signal B from the control circuit 23 by the inverter 27 is at logic "1". The selector 28 selects the transmitting signal $S_T$ or the chirp signal C, and outputs the selected signal to a modulator 29. The output from the modulator 29 is transmitted through the antenna 31.

The base station repetitively transmits a frame sync signal for giving a time reference for position determination at predetermined time intervals (frame periods T) like in the conventional system. In one frame period T, position determination of one vehicle station is performed. In other words, the position determination is time-divisionally performed. The frame sync signal is detected by the frame sync detector 22 of the vehicle, and the detected frame sync signal A is supplied to the chirp signal generator 24.

The chirp signal generator 24 generates the chirp signal C for performing frequency sweep over all the bandwidth W of the satellite network for a predetermined period of time and at a predetermined sweep rate in response to the frame sync signal A, and supplies the signal to the switching circuit 25.

Figure 8:
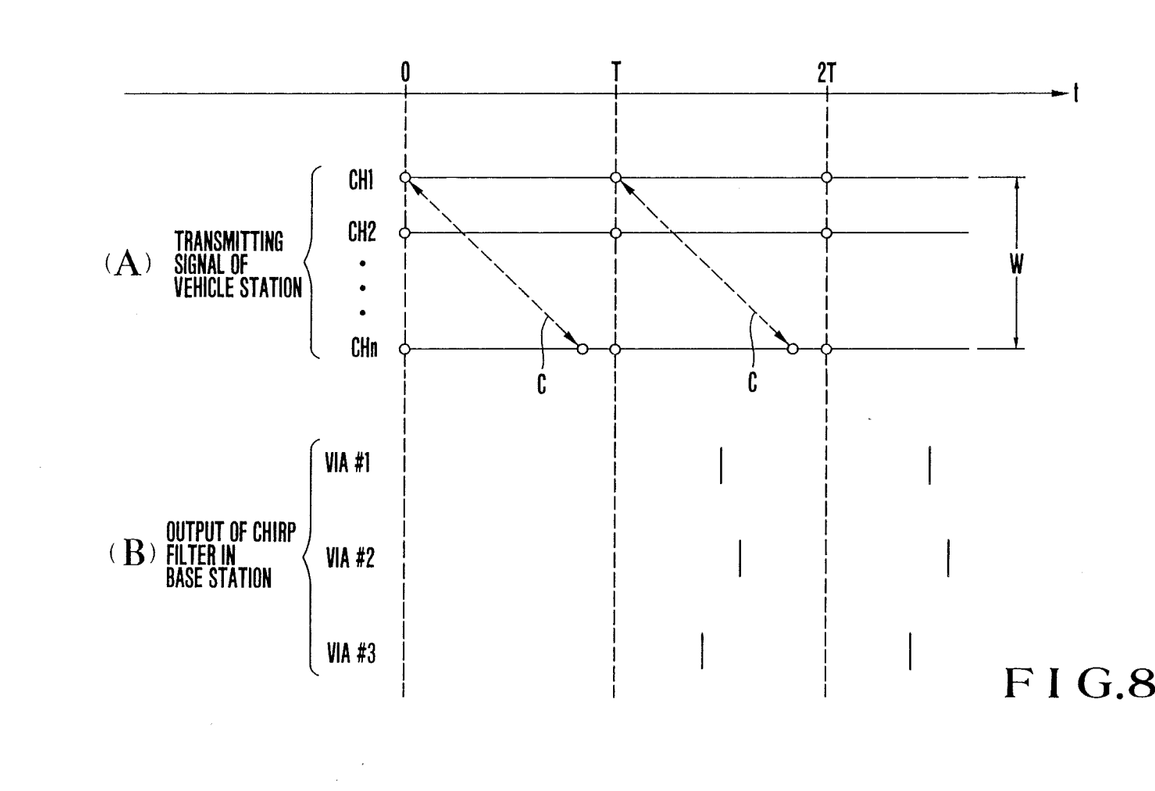
FIGS. 8(A) and 8(B) are views for explaining the operation of the base station and the vehicle shown in FIGS. 6 and 7, respectively.

The above-mentioned operation is performed during vehicle FDM receiving operations for frequency-selectively receiving a signal in the communication frequency channel assigned to the self station from signals in a plurality of communication frequency channels received at a low-directivity antenna and the received signal in the frequency-selected communication frequency channel is sent to a following circuit through the control circuit 23 as the receiving signal $S_R$ in a normal communication mode. In this case, since the control circuit 23 detects no base station control signal (to be described later) from the input signal, it sets the control signal B at "0" level. Therefore, the control signal supplied to the switching circuit 26 is at "1" level, and the transmitting signal $S_T$ is transmitted through the switching circuit 26, the selector 28, the modulator 29, and the antenna 31. FIG. 8(A) shows the transmitting signals in the channels CH1 to CHn in this state. That is, an operation in this state is the same as in the conventional SCPC-FDMA system.

When the base station selects a predetermined vehicle station as an object to be position-determined, or when the base station receives a position determination request signal from the vehicle station requesting the position determination, the base station transmits a base station control signal including a message indicating that position determination is to be performed and a frame period to be used to the vehicle station as a communication signal. In the vehicle station, the base station control signal is detected by the control circuit 23, and is sent to a transmitting signal $S_T$ generator (not shown). The generator transmits the transmitting signal including a response signal as the position determination start signal to the base station. In response to the base station control signal, the control circuit 23 sets the period control signal B at "1" level during time interval of a designated frame period. Then, the switching circuit 26 inhibits passage of the transmitting signal $S_T$, and the switching circuit 25 supplies the chirp signal C to the selector 28. As a result, the chirp signal C is transmitted to the satellite network. As shown in FIG. 8(A), a given vehicle station transmits the chirp signal C during a time interval of a first frame period (0 to T) and another vehicle station transmits the chirp signal C during a time interval of a second frame period (T to 2T).

When the control circuit 3 of the base station detects the position determination start signal from the input signal, it supplies control signal E to the time difference detector 5. The chirp signals received at the antennas 32a, 32b, and 32c are respectively input to the chirp signal receivers 4a, 4b, and 4c, and are subjected to pulse compression processing by the corresponding chirp filters. FIG. 8(B) shows output signals from the chirp filters. The compressed pulses obtained in this manner are supplied to the time difference detector 5.

The time difference detector 5 detects time differences among the three compressed pulses in response to the control signal E, and supplies them to a position determination arithmetic means (not shown) as position determination signals $S_P$.

The overall operation of the satellite-based vehicle communication/position determination system according to the present invention will be described below.

For example, two-way communication and position determination in a system using the three geostationary satellites $S_1$, $S_2$, and $S_3$, as shown in FIG. 1 are performed as follows.

The vehicle station transmits a communication signal to the geostationary satellites $S_1$, $S_2$, and $S_3$ from the low-directivity antenna using a communication frequency channel assigned to the vehicle station. When there are a plurality of vehicle stations, FDM communication signals are transmitted to the base station through the three different transmission paths #1, #2, and #3.

In this case, a vehicle station requiring position determination inserts the control signal E representing the position determination start signal into the communication signal.

In the base station, reception/demodulation processing is performed for signals in one or a plurality of communication frequency channels received at one (e.g., 32a) of the three high-directivity antennas through the separator 1, the demodulator 2, and the control circuit 3, thus obtaining the receiving signal Sa. In this case, the control circuit 3 detects the position determination start signal E from its input signal.

The transmitting section of the base station transmits, from at least one of the three high-directivity antennas to the corresponding geostationary satellite, a signal in one or a plurality of communication frequency channels in which a communication signal including the base station control signal for designating a time period for which the vehicle station should transmit the chirp signal is inserted.

More specifically, the base station transmits the frame sync signal of the predetermined period T like in the conventional system so as to send, to a vehicle station requesting position determination or a vehicle station selected as an object to be position-determined, a message indicating a frame period for which the chirp signal is to be transmitted.

In the vehicle station, the frame sync detector 22 detects the frame sync signal, and the chirp signal generator generates the chirp signal C for performing frequency sweep over all the bandwidth of the satellite network for a predetermined period of time and at a predetermined sweep rate in response to the frame sync signal. In the vehicle station requiring position determination, when a signal in the communication frequency channel assigned to the self station is frequency-selectively received from signals in a plurality of communication frequency channels received at the antenna 31, the control circuit 23 transmits the receiving signal $S_R$ to the following circuit, and detects the base station control signal B from the signal $S_R$. Then, transmission of the communication signal is interrupted for an interval designated by the base station control signal B, and the chirp signal C is transmitted from the antenna 31 during the interruption interval.

Thus, in the base station, the chirp signal receivers 4a, 4b, and 4c perform pulse compression processing of the chirp signals received at the high-directivity antennas 32a, 32b, and 32c, respectively. The time difference detector 5 detects time differences among the three compressed pulses sent out from the chirp signal receivers 4a, 4b, and 4c upon detection of the control signal E, and generates the position determination signal $S_P$ for calculating the position of the vehicle station.

Note that the number of geostationary satellites can be three if a vehicle station moves on the ground or sea. However, if a vehicle station is an aircraft, four satellites are required since an altitude must also be determined.

To summarize, in the satellite-based vehicle communication/position determination system of the present invention, at least two geostationary satellites for position determination are added to an existing SCPC-FDMA type satellite-based vehicle communication system, a vehicle station is provided with a chirp signal generator having a simpler arrangement than the spread spectrum modulation system to transmit a chirp signal during position determination, and time differences among compressed pulses of the chirp signals are detected in the base station. The precision of position determination can be improved by appropriately selecting the sweep rate, time, and range of the chirp signals.

The system of the present invention does not require complicated sync control requiring much time unlike in the conventional system, and quick position determination can be achieved.

A communication mode is not limited to a message communication mode, and signals in communication frequency channels of the FDM transmission paths can be communication signals in arbitrary modulation modes, such as digital modulation signals, angular modulation signals, and single side band amplitude modulation signals, and the like. Thus, a very wide application range can be provided.

The precision and the like of the position determination system of the present invention will be examined below.

If a transmitting chirp signal c(t) of a vehicle station is given by:

$$c(t) = \begin{cases} e^{j\mu(t-T/2)^2} & (0 < t < T) \\ 0 & (t < 0, t < T) \end{cases} \quad (1)$$

a receiving signal r(t) is given by:

$$r(t) = c(t) + n(t) \quad (2)$$

where n(t) is the total undesired wave including transmission path noise and signal waves of other channels.

If an impulse response h(t) of a chirp filter of a reference station is given by:

$$h(t) = \begin{cases} e^{-j\mu(t-T)^2} & (0 < t < T) \\ 0 & (t < 0, t > 2T) \end{cases} \quad (3)$$

an output d(τ) of the chirp filter receiving the receiving signal r(t) is given by:

$$\begin{aligned} d(\tau) &= \int r(t)h(\tau - t)dt \\ &= V_{os}(\tau) + V_{on}(\tau) \end{aligned} \quad (4)$$

For $$V_{os}(\tau) = \int c(t)h(\tau - t)dt \quad (5)$$

$$V_{on}(\tau) = \int n(t)h(\tau - t)dt \quad (6)$$

where $V_{os}(\tau)$ is the desired wave output, and $V_{on}(\tau)$ is the undesired wave output.

Paying attention to the range of T<τ<2T, the desired wave output $V_{os}(\tau)$ is given by:

$$V_{os}(\tau) = Te^{-j\mu(\tau-3T/2)^2}\frac{\sin\mu T(\tau - 3T/2)}{\mu T(\tau - 3T/2)} \quad (7)$$

That is, the desired wave output becomes a pulse having a peak value in a time given by:

$$\tau = 3T/2 \quad (8)$$

As shown in FIG. 8(B), the pulses are output near the middle of each frame period. A pulse width Δt is about:

$$\Delta t = \frac{2\pi}{\mu T} = \frac{1}{\mu T/2\pi} \quad (9)$$

Note that the amplitude of the pulse is proportional to an integration time T, as represented by equation (7).

More specifically, the chirp filter compresses the chirp signal of a given amplitude of a time duration T into an impulse having a pulse width Δt, and its pulse compression ratio is given by:

$$\frac{T}{\Delta T} = \left(\frac{\mu T}{2\pi}\right) \cdot T \quad (10)$$

In equation (10), since the first term is a frequency sweep bandwidth of the chirp signal given by equation (1) (the product of a sweep time and a sweep rate, and is indicated by B), equation (10) provides a so-called B·T product. A noise component given by equation (6) is an integral result over an average time T.

The characteristic features of the present invention are the following two points. First, required time precision depends on the pulse width Δt of the compressed pulse. As can be seen from equation (9), the frequency sweep bandwidth μT of the chirp signal is appropriately selected, so that the desired precision can be obtained. Second, the sweep time T is set to be large, so that a high S/N ratio can be realized, thus allowing accurate time measurement.

The second feature will be explained with reference to the following example. For example, assume that the position determination system of the present invention is embodied in an SCPC-FDMA type satellite-based vehicle communication system which has all the bandwidth of a satellite network=4 MHz, and processes 400 channels of BPSK (Biphase Phase Shift Keying) signals having a signal rate of 4.8 kb/s.

The B·T product is set to be 40, and the sweep time T is given by:

$$T = 40 \text{ symbols} = 40\frac{1}{4.8 \times 10^3} \text{ (sec)} \quad (11)$$

A sweep range μT/2π is given by:

$$\frac{\mu T}{2\pi} = 4 \text{ MHz} \quad (12)$$

From equation (9), the time precision is:

$$\Delta T = \frac{1}{\mu T/2\pi} = 2.5 \times 10^{-7} \text{ (sec)} \quad (13)$$

If the time precision is converted to a distance error Δt, the error Δt is:

$$\Delta t = c\Delta t = 75 \text{ (m)} \quad (14)$$

where c is the velocity of light.

In this case, the S/N ratio with respect to an interference wave is:

$$10 \log 40 = 16 \text{ (dB)} \quad (15)$$

Meanwhile, the influence of the chirp signal on each communication frequency channel is as follows. By using equations (11) and (12), the sweep rate is given by:

$$\frac{2\mu}{2\pi} = \frac{4 \times 10^6}{40 \times \frac{1}{4.8 \times 10^3}} \quad (16)$$

$$= \frac{4 \times 10^6 \times 4.8 \times 10^3}{40} \text{ (Hz/sec)}.$$

Thus, the sweep rate is obtained as a time interval for which the chirp signal stays in the communication frequency channel having a signal frequency of 4.8 kHz. The time interval is:

$$\frac{4.8 \times 10^3}{2\mu/2\pi} = 10^{-5} \text{ (sec)} \quad (17)$$

This time interval is 1/20 a transmission rate of each communication frequency channel given by:

$$\frac{1}{4.8 \times 10^3} = 2 \times 10^{-4} \text{ (sec)} \quad (18)$$

Therefore, the influence of the chirp signal can be almost negligible.

As described above, according to the satellite-based vehicle communication system of the present invention, since a chirp signal which can be realized by a simpler arrangement than the spread spectrum modulation system is used as a position determination means on the basis of the existing SCPC-FDMA type satellite-based vehicle communication system, complicated sync control requiring much time is not necessary unlike in the conventional system, and position determination can be easily and quickly performed as well as two-way communication by the normal SCPC-FDMA system. The precision of the position determination can be improved by appropriately selecting the sweep rate, time, and range of the chirp signal. A communication mode is not limited to a message communication mode, and signals in communication frequency channels of FDM transmission paths can be communication signals in arbitrary modulation modes, such as digital modulation signals, angular modulation signals, single side band amplitude modulation signals, and the like. Thus, a very wide application range can be realized.

What is claimed is:

1. A satellite-based vehicle communication/position determination system comprising:

N geostationary satellites, N being an integer greater than or equal to 3; at least one vehicle station; and a base station, each of said vehicle station comprising:

a low-directivity antenna for performing radio-wave exchange with said N geostationary satellites;

vehicle station FDM (frequency division multiplex) receiving means for frequency-selectively receiving a signal in a communication frequency channel assigned to the self station from various signals in a plurality of communication frequency channels received at said low directivity antenna;

vehicle station receiving control means for transmitting a signal output of said vehicle station FDM receiving means as a receiving signal to a following circuit, and detecting a base station control signal from the signal output;

chirp signal generating means for generating a chirp signal for performing frequency sweep over all the bandwidth of a satellite network at a predetermine sweep rate for a predetermined period of time in response to a frame sync signal detected and formed by said vehicle station FDM receiving means; and vehicle station transmitting means for transmitting a communication signal including a position determination start signal from said low-directivity antenna to said N geostationary satellites in the communication frequency channel assigned to the self station, interrupting the transmission of the communication signal for a period of time designated by a control signal from said base station and transmitting the chirp signal from said low-directivity antenna during the interruption period, and said base station comprising:

N high-directivity antennas for respectively performing radio-wave exchange with said N geostationary satellites;

base station FDM transmitting means for transmitting, from at least one of said N high-directivity antennas to the corresponding geostationary satellite, signals in one or a plurality of communication frequency channels in which the communication signal including the base station control signal for designating a time period for which the chirp signal is to be transmitted is inserted;

base station FDM receiving means for receiving and demodulating signals in one or a plurality of communication frequency channels received at one of said N high-directivity antennas;

base station reception control means for transmitting the signal output from said base station FDM receiving means to a following circuit as a receiving signal, and detecting a start signal from the signal output;

N chirp signal receiving means including chirp filters for performing pulse compression processing of the chirp signals received at said N high-directivity antennas; and time difference detecting means for detecting time differences among N compressed pulses sent from said N chirp signal receiving means in response to the detection of the start signal, and forming a position determination signal for calculating the position of the vehicle station.

* * * * *